United States Patent [19]

Feldhues et al.

[11] Patent Number: 5,093,033

[45] Date of Patent: Mar. 3, 1992

[54] SOLUBLE, ELECTRICALLY CONDUCTIVE POLYMERS, PROCESS FOR PREPARING THEM, AND THEIR USE

[75] Inventors: Michael Feldhues, Bad Soden am Taunus; Thomas Mecklenburg, Butzbach; Peter Wegener, Königstein/Taunus; Günther Kämpf, Oestrich-Winkel, all of Fed. Rep. of Germany

[73] Assignee: Hoechst Aktiengesellschaft, Frankfurt am Main, Fed. Rep. of Germany

[21] Appl. No.: 88,662

[22] Filed: Aug. 24, 1987

[30] Foreign Application Priority Data

Aug. 26, 1986 [DE] Fed. Rep. of Germany ....... 3628895
May 26, 1987 [DE] Fed. Rep. of Germany ....... 3717669

[51] Int. Cl.$^5$ .................... H01B 1/00; C08F 28/06; B32B 9/04
[52] U.S. Cl. .................... 252/500; 526/256; 526/258; 252/512; 252/518; 428/375; 428/411.1
[58] Field of Search .................... 252/500, 512, 518; 526/256, 257, 258; 428/411.1, 375, 392, 394, 500

[56] References Cited

U.S. PATENT DOCUMENTS 4,599,194 7/1986 Frommer et al. .................... 252/518

FOREIGN PATENT DOCUMENTS 0203438 12/1986 European Pat. Off. .

OTHER PUBLICATIONS

Blankespoor, R. L. et al, J. Chem. Soc., Chem. Commun., 1985, No. 2, 90-92.
Tanaka, S. et al, Polymer Commun., 26, 303-306 (1985).
Tanaka, S, et al, Chem. Abs. 105:61116a (1986).
Bargon, J. et al., IBM J. Res. Develop. 27, 330-341 (1983).
Barton, A. F., Handbook of Solubility Parameters and Other Cohesion Parameters, CRC Press, 1983, pp. 153-162.
G. Dian et al, Synthetic Metals 15, 281 (1986).

Primary Examiner—Josephine Barr

[57] ABSTRACT

The invention relates to intrinsically electrically conductive polymers, preferably oligomers, which, in the oxidized form, are completely soluble in dipolar aprotic solvents at room temperature and which contain structural units which are derived from at least one monomer of the formula (I)

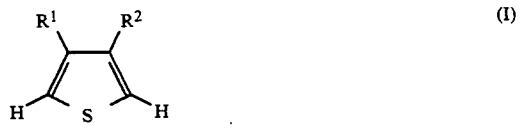

in which $R^1$ is a $C_1$-$C_2$-alkoxy group or $-O(CH_2CH_2O)_nCH_3$ with $n=1$ to 4 and $R^2$ is a hydrogen atom, a $C_1$-$C_{12}$-alkyl group, a $C_1$-$C_{12}$-alkoxy group or $-O(CH_2CH_2O)_nCH_3$ with $n=1$ to 4, or $R^1$ and $R^2$ together are $-O(CH_2)_m-CH_2$ or $-O(CH_2)_m-O-$ with $m=1$ to 12. The invention also relates to a process for the preparation of these polymers by electrochemical polymerization of at least one monomer of this formula (I) in the presence of a conductive salt, the anode having a specific surface area of at least 0.01 m$^2$/g and preferably a gauze, sponge, fabric or felt structure, the electrolyte solvent being dipolar and aprotic and the electrolyte system being moved only slightly or not at all relative to the anode. The polymers according to the invention can readily be used especially for coating purposes.

12 Claims, No Drawings

SOLUBLE, ELECTRICALLY CONDUCTIVE POLYMERS, PROCESS FOR PREPARING THEM, AND THEIR USE

It is known that heteroaromatics can be polymerized oxidatively, for example by anodic oxidation, and thus form electrically conductive polymers which are of interest for electrical engineering, in semiconductor components, switches, screening materials, solar cells and as electrode materials in electrochemical syntheses and in reversible charge stores (cf., for example, IBM J. Res. Develop. 27, 330 (1983)).

The overriding disadvantage of all hitherto known electrically conductive polymers is that they are not fusible, are not thermoplastically processable and, with a few exceptions, are not soluble in one of the conventional organic solvents.

The few electrically conductive polymers which are partially soluble in the doped state are not yet satisfactory with respect to their solubility, their long-term stability of the electrical conductivity, the thermal stability and the film-forming properties (cf. Synthetic Metals 15, 169 (1986)).

Finally, electrically conductive solutions of polymers of substituted thiophenes are also known, which have been prepared by a chemical doping step "in situ", i.e. during the polymerization (cf. European Published Application 203,438). These solutions have, however, the disadvantage that conductive articles made from them are inevitably contaminated by doping agents or reaction products thereof, and this can cause adverse effects in the envisaged applications.

It was therefore the object of the present invention to provide a pure form of an electrically conductive material which is homogeneously soluble in at least some of the conventional organic solvents and has good film-forming properties and a high thermal stability.

The invention thus relates to an intrinsically electrically conductive polymer of structural units which are mutually linked in the 2-position and/or 5-position and are composed, as a statistical mean, of 60 to 100% by weight of structural units which are derived from at least one monomer of the formula (I)

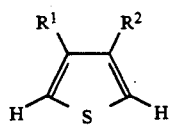
(I)

in which
$R^1$ is a $C_1$–$C_{12}$-alkoxy group or —O(CH$_2$CH$_2$O)$_n$CH$_3$ with n=1 to 4 and
$R^2$ is a hydrogen atom, a $C_1$–$C_{12}$-alkyl group, a $C_1$–$C_{12}$-alkoxy group or —O(CH$_2$CH$_2$O)$_n$CH$_3$ with n=1 to 4,
or $R^1$ and $R^2$ together are —O(CH$_2$)$_n$—CH$_2$— or —O(CH$_2$)$_m$—O with m=1 to 12,
of 0 to 40% by weight of structural units which are derived from at least one monomer of the formula (II)

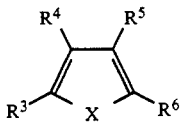
(II)

in which
$R^4$ and $R^5$ independently of one another are a hydrogen atom, a halogen atom, a $C_1$–$C_{12}$-alkyl group or aryl or, together with the carbon atoms linking them, form an aromatic ring,
$R^3$ and $R^6$ independently of one another are a hydrogen atom or $R^3$ together with $R^4$ and the carbon atoms linking them or $R^5$ together with $R^6$ and the carbon atoms linking them in each case form an aromatic ring, and X is an oxygen atom, a sulfur atom, an =NH group, an =N-alkyl group or an =N-aryl group, of 0 to 40% by weight of structural units which are derived from at least one monomer of the formula (III)

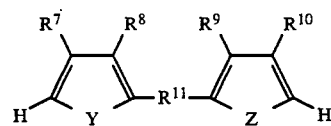
(III)

in which
$R^7$, $R^8$, $R^9$ and $R^{10}$ independently of one another are a hydrogen atom, a $C_1$–$C_{12}$-alkyl group, a $C_1$–$C_{12}$-alkoxy group or an aryl group,
Y and Z independently of one another are an oxygen atom, a sulfur atom, an =NH group, an =NH-alkyl group or an =N-aryl group and
$R^{11}$ is an arylene group, a heteroarylene group or a conjugated system of the formula (CH=CH)$_o$, where o is zero, 1, 2 or 3, and
of 0 to 40% by weight of structural units which are derived from at least one monomer of the formula (IV)

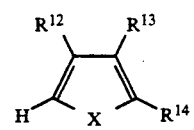
(IV)

in which
$R^{12}$ and $R^{13}$ independently of one another are a hydrogen atom, a halogen atom, a $C_1$–$C_{12}$-alkyl group, a $C_1$–$C_{12}$-alkoxy group, a $C_1$–$C_4$-alkylamino group or a $C_1$–$C_4$-acyl-amino group,
$R^{14}$ is a halogen atom, a $C_1$–$C_{12}$-alkyl group, a $C_1$–$C_{12}$-alkoxy group, a $C_1$–$C_4$-alkylamino group or a $C_1$–$C_4$-acyl-amino group and
X is as defined above,
the polymer in the oxidized form being completely soluble in dipolar aprotic solvents at 25° C. and solutions with a content of at least 0.1 g of polymer in 100 ml of solvent being obtained at 25° C.

The invention also relates to a process for preparing the intrinsically electrically conductive polymer by electrochemical polymerization of at least one monomer of the formula (I), if desired together with comonomers, in the presence of a conductive salt, wherein the anode has a specific surface area of at least 0.01 m$^2$/g, the electrolyte solvent is dipolar and aprotic and the electrolyte system is moved only slightly or not at all relative to the anode.

The polymers according to the invention contain structural units which are derived by linking, in the 2-position and/or the 5-position, at least one monomer of the general formula (I)

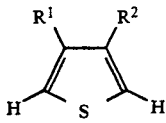

in which

R$^1$ is a C$_1$–C$_{12}$-alkoxy group, preferably a C$_1$–C$_4$-alkoxy group and especially a C$_1$–C$_2$-alkoxy group, or —O(CH$_2$CH$_2$—O)$_n$CH$_3$ with n=1 to 4, preferably 1 or 2, and R$^2$ is a hydrogen atom, a C$_1$–C$_{12}$-alkoxy group, preferably a C$_1$–C$_4$-alkoxy group and especially a C$_1$–C$_2$-alkoxy group, a C$_1$–C$_{12}$-alkyl group, preferably a C$_1$–C$_4$-alkyl group, or —O(CH$_2$CH$_2$O)$_n$CH$_3$ with n=1 to 4, preferably 1 or 2, or R$^1$ and R$^2$ together are —O(CH$_2$)$_m$—CH$_2$— or —O(CH$_2$)$_m$—O— with m=1 to 12, preferably 1 to 4.

Examples of representatives of the formula (I) are 3-methoxythiophene, 3-ethoxythiophene, 3-propoxythiophene, 3-methoxy-4-methylthiophene, 3-methoxy-4-ethylthiophene, 3-methoxy-4-butylthiophene, 3-ethoxy-4-methylthiophene, 3-ethoxy-4-ethylthiophene, 3,4-dimethoxythiophene, 3-ethoxy-4-methoxythiophene, 3-butoxy-4-methoxythiophene, 3-(methoxyethoxy)-thiophene, 3-(methoxyethoxyethoxy)-thiophene, 3,4-(ethylene-1,2-dioxy)-thiophene and 3,4-(prop-3-ylen-1-oxy)-thiophene. Mixtures of the monomers (I) can also be used.

All aromatics and heteroaromatics which can form electrically conductive polymers and are copolymerizable with the monomers (I) can be used as comonomers for the monomers (I). Examples which may be mentioned here are compounds of the formula (II)

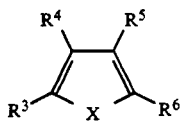

R$^4$ and R$^5$ independently of one another are a hydrogen atom, a halogen atom, a C$_1$–C$_{12}$-alkyl group, preferably a C$_1$–C$_4$-alkyl group, or an aryl group, preferably phenyl or thienyl, or, together with the carbon atoms linking them, they form an aromatic ring, preferably a benzene, thiophene or pyrrole ring.

R$^3$ and R$^6$ independently of one another are a hydrogen atom or, together with R$^4$ or R$^5$ respectively and with the carbon atoms linking them, form an aromatic ring, preferably a benzene, thiophene or pyrrole ring.

X is an O atom, an S atom, an =NH group, an =N-alkyl group, preferably =N-C$_1$–C$_4$-alkyl, or N-aryl, preferably N-phenyl.

Pyrrole, 3-chloropyrrole, 3-methylpyrrole, 3,4-dimethylpyrrole, N-methylpyrrole, thieno[3,2-b]pyrrole, carbazole, thiophene, 3-methylthiophene, 3-octylthiophene, 3,4-dimethylthiophene, 3,4-diethylthiophene, isothianaphthene and thieno[2,3-b]thiophene, di-thieno[3,2-b; 2',3'-d]thiophene and dibenzothiophene, preferably pyrrole and 3-methylthiophene, are suitable.

Further comonomers for monomers (I) are those of the formula (III):

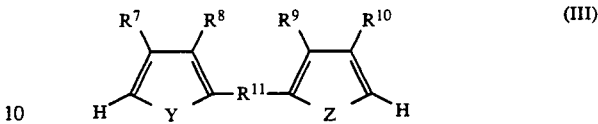

R$^7$, R$^9$ and R$^{10}$ independently of one another are a hydrogen atom, a C$_1$–C$_{12}$-alkyl group, preferably C$_1$–C$_4$-alkyl, a C$_1$–C$_{12}$-alkoxy group, preferably C$_1$–C$_4$-alkoxy, or an aryl group, preferably phenyl or thienyl. Y and Z independently of one another are an O atom, an S atom, an =NH group, an =N-alkyl group, preferably =N-C$_1$–C$_4$-alkyl, or an =N-aryl group, preferably =N-phenyl. R$^{11}$ is arylene, preferably phenylene, heteroarylene, preferably thienylene, furanylene or pyrrolylene, or a conjugated system of the formula

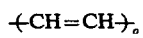

with o=0, 1, 2 and 3.

Especially 1,2-di-(2-thienyl)-ethene, 1,2-di-(3-methylthien-2-yl)-ethene, 1,2-di-(2-furanyl)-ethene, 1-(2-furanyl)-2-(2-thienyl)-ethene, 1-(2-pyrrolyl)-2-(2-thienyl)-ethene, 1,4-di-(2-thienyl)-buta-1,3-diene, 1,4-di-(2-furanyl)buta-1,3-diene, 1,4-di-(2-thienyl)-benzene, terthienyl (2,5-di-(2-thienyl)-thiophene), 2,5-di-(2-thienyl)-pyrrole, 2,2'-bithiophene, 3,3'-dimethyl-2,2'-bithiophene, 3,3'-dimethoxy-2,2'-bithiophene, 3,4'-dimethoxy-2,2'-bithiophene and 4,4'-dimethoxy-2,2'-bithiophene are suitable.

The above comonomers (II) and (III) can also be used as a mixture with one another. The preparation of the compounds (II) and (III) is known from the state of the art.

The polymers according to the invention preferably contain three to ten structural units, especially four to nine structural units and with very particular preference five or six structural units. The quantity of the structural units derived from at least one monomer of the formula (I) is, as a statistical mean, 60 to 100% by weight, preferably 90 to 100% by weight and especially 95 to 100% by weight, relative to the structural units present in the undoped polymer.

The quantity of the structural units derived from monomers of the formula (II) is, as a statistical mean, 0 to 40% by weight, preferably 0 to 10% by weight, and the structural units derived from monomers of the formula (III) are, as a statistical mean, present in an amount of 0 to 40% by weight, preferably 0 to 10% by weight.

Moreover, the end groups of the polymers according to the invention can be formed by structural units of the monomers (IV), which can be added to the monomers of the general formula (I) for modifying the degree of polymerization and the physical properties.

R$^{12}$ and R$^{13}$ independently of one another are a hydrogen atom, a halogen atom, preferably chlorine or bromine, a $C_1-C_{12}$-alkyl group, preferably $C_1-C_4$-alkyl, a $C_1-C_{12}$-alkoxy group, preferably $C_1-C_4$-alkoxy, a $C_1-C_4$-alkylamino group or a $C_1-C_4$-acylamino group, preferably acetylamino. $R^{14}$ is a halogen atom, a $C_1-C_{12}$-alkyl group, preferably $C_1-C_4$-alkyl, a $C_1-C_{12}$-alkoxy group, preferably $C_1-C_4$-alkoxy, a $C_1-C_4$-alkylamino group or a $C_1-C_4$-acylamino group, preferably acetylamino. X is as defined above.

Examples of compounds of the formula (IV) are 2-methoxythiophene, 2-methylthiophene, 2-bromothiophene, 2-chlorothiophene, 2-acetylaminothiophene, 2-bromo-3-methoxythiophene, 2-bromo-4-methoxythiophene, 2-chloro-3-methylthiophene, 2,3-dimethoxythiophene, 2,4-dimethoxythiophene, 2,3-dimethylthiophene, 3-methoxy-2-methylthiophene, 2-methoxy-3-methylthiophene and 4-methoxy-2-methythiophene, 2-chloro-4-methoxythiophene, 2-acetylamino-3-methoxythiophene, 2-methylpyrrole, 2-bromopyrrole, 2-chloropyrrole, 2-methylfuran and 2-methoxyfuran. Due to the substitution in the 2-position, these compounds have a chain-stopping action. The quantity of (IV) is as a rule 0 to 40% by weight, preferably less than 10% by weight and especially less than 5% by weight, relative to the total quantity of monomers.

The soluble, electrically conductive polymers contain, in the oxidized form, a corresponding number of anions for compensating the positive charges. These are preferably the anions of the conductive salt which was used in the preparation process. Examples of suitable anions which may be mentioned here are: $BF_4^-$, $PF_6^-$, $SbF_6^-$, $SbCl_6^-$ $FeCl_4^-$, $Fe[(CN)_6)]^{3-}$, $F^-$, $Cl^-$, $Br^-$, $SCN^-$, $SO_4^{2-}$, $HSO_4^-$, $PO_4^-$, $Fe[(CN)_6)]^{3-}$, $F^-$, $CL^-$, $Br^-$, $SCN^-$, $SO_4^{2-}$, $HSO_4^-$, alkyl-$CO_2^-$, perfluoroalkyl-$CO_2^-$, aryl-$CO_2^-$ and phenolate. With a loss of thermal stability, $ClO_4^-$ and $NO_3^-$ can also be used. $BF_4^-$, $PF_6^-$ and $CF_3SO_3^-$ are preferred according to the invention. Mixtures of the abovementioned anions introduced into the polymer can also be present. The number of these anions, relative to the number of monomer units, is in most cases 10 to 30%, preferably 15 to 25%.

The preparation of the polymers according to the invention is carried out by oxidative polymerization, preferably by electrochemical (anodic) polymerization of the monomers by means of certain anodes and under certain electrolysis conditions.

The essential prerequisite for the process according to the invention is in the first place the anode material in conjunction with the specific surface area and geometry of the anode used, since these determine to a considerable extent the degree of polymerization and hence the properties of the products being formed. Thus, it is necessary to choose an electrode form which provides a large specific surface area with many cavities. The specific surface area of the anode materials according to the invention is therefore in the range from 0.01 to 100 $m^2/g$, preferably in the range from 0.1 to 10 $m^2/g$ and especially 0.2 to 5 $m^2/g$. Those anodes prove to be particularly suitable for the purpose according to the invention which, due to their structured (non-smooth) geometry enclose a large internal volume, such as, for example, gauze-like, sponge-like, fabric-like, honeycomb-like and felt-like forms, in the cavities of which the products formed can readily deposit. The anode material used can be a material which is stable under the conditions of the anodic polymerization, such as a precious metal, for example platinum or gold, or precious metal alloys. Examples of these are single-ply and multiply gauzes of platinum or platinum/rhodium alloys. However, materials of carbon, especially of pyrolytic carbon, are preferred. Examples of preferred anode materials are hard and soft felts and multi-ply fabrics of carbon fibers. Preferably, an anode arrangement with an alignment parallel to the cathode is chosen. When two anodes are used, these are at the same distance in front of and behind the cathode.

The cathode consists of one of the conventional electrode materials, such as, for example, platinum, gold, nickel, copper, silver, graphite or vitreous carbon, and preferably of stainless steel. It can be used in the form of plates, sheets or gauzes and is in general arranged parallel to the anode. When two cathodes are used, these are at the same distance in front of and behind the anode. In order to prevent a short circuit, the cathode can be separated from the anode by means of a spacer which consists, for example, of an inert plastic netting.

To enable the polymers to deposit on the anode and to prevent the product formed from being immediately dissolved again completely in the electrolyte, neither fairly vigorous stirring nor fairly vigorous flow is permissible in the process according to the invention, in contrast to conventional electrolysis conditions. The otherwise diffusion controlled mass transfer of the monomers to the anode can be assisted by discontinuous stirring of the electrolyte or a slow continuous or discontinuous flow of the electrolyte or slow continous or discontinuous rotation of the electrodes. The flow velocity of the electrolyte relative to the anodes is as a rule less than 1 cm/second, preferably less than 0.5 cm/second and especially less than 0.1 cm/second. The voluminous anodes which were described above and which enclose a large space element of the electrolyte favor the mass transfer due to the short diffusion paths and, if appropriate, allow a reaction procedure which is completely without stirring or flow.

The electrochemical polymerization of the monomers or monomer mixtures is carried out in a dipolar aprotic electrolyte solvent system. In addition to stability under the conditions of the electrochemical polymerization and adequate dissolving properties for the monomer and conductive salt, this should also possess certain dissolving properties for the oxidized form of the polymers to be synthesized, so that the latter do not permanently occupy the surface of the electrode and thus promote the formation of higher-molecular and hence insoluble end-products and impede the transfer of monomers to the anode surface, but swell incipiently and deposit in the form of sludgy masses in the cavities and on the periphery of the anode used according to the invention. Examples of suitable electrolyte solvents are acetonitrile, benzonitrile, propylene carbonate, nitrobenzene, nitromethane and sulfur dioxide as well as mixtures of these solvents, if appropriate also with other solvents which are stable under the conditions of the electrochemical polymerization, such as, for example, methylene chloride and tetrahydrofuran. An addition of less than five percent of a polar protic solvent, such as water, methanol or the acid on which the conductive salt is based, can sometimes be of advantage.

As conductive salts, which serve for current transport during the electrochemical polymerization and control the solubility of the deposited polymers in the electrolyte solvent system, and the anions of which are incorporated into the polymers and can influence the properties of the latter, such as thermal stability, solubility and electrical conductivity, the compounds conventional per se are used. Examples which may be mentioned here are tetrafluoborates, hexafluoroantimonates, hexafluoroarsenates, hexafluorophosphates, hexachloroantimonates, perchlorates and perfluoroalkylsulfonates. Tetrafluoborates, hexafluorophosphates and trifluoromethanesulfonates are preferred here. Mixtures of these conductive salts can also be used. Tetraalkylammonium tetrafluoborates are particularly preferred.

Apart from alkaline earth metal cations and $H^+$, especially the alkali metal cations are suitable as the cations for the conductive salts. Cations of the type $R_4N^+$ or $R_4P^+$, wherein the radicals R independently of one another are each hydrogen, $C_1$-$C_6$-alkyl radicals or cycloaliphatic or aromatic radicals, prove to be particularly advantageous. The quantity of conductive salt is in general between 0.01 and 1 mol, preferably 0.05 and 0.05 mol, per liter of solvent. Medium to high concentrations of conductive salt here generally promote the yield of polymers according to the invention.

The monomer concentration, which is of importance for the degree of polymerization of the polymers according to the invention, is 0.01 to 5 mol, preferably 0.05 to 1 mol, of monomers per liter of electrolyte solvent. In the case of comonomer mixtures, the proportion of monomers (I) is in general greater than 60%, preferably greater than 90% and especially greater than 95%, relative to the total quantity of monomers.

The electrochemical polymerization is preferably carried out at room temperature. However, the temperature can also be varied in a fairly wide range which is limited downwards by the solidification temperature and upwards by the boiling point of the electrolyte solvent system and is in most cases in the range from $-60°$ to 80° C., preferably $-20°$ to $+50°$ C. The highest yields are in general obtained at a temperature from $-10°$ to 40° C.

The duration of the electrolysis depends on the electrolyte system used, the particular electrolysis conditions and especially the quantity of the monomers employed. Usually, the duration of the electrolysis is 1 to 12 hours, preferably 2 to 8 hours.

The electrochemical polymerization can be carried out in the conventional cells or electrolysis apparatus. For example, simple electrolysis apparatus comprising an undivided cell, two or more electrodes and an external current/voltage source is suitable. However, divided cells with diaphragms or ion exchanger membranes or those with reference electrodes for an exact determination of the potential can also be used. It is advisable to measure the current consumption, since this allows the quantity of monomer already consumed to be estimated. An electrolysis apparatus in which the cathode is formed as the bottom surface and the anode is passed in the form of a strip at constant advance through the electrolyte allows the process to be carried out continuously.

Any d.c. voltage source which provides a sufficiently high electric voltage is suitable as the current/voltage source for operating the electrolytic cell in which the process according to the invention is carried out. Usually, the electrochemical polymerization is operated at a voltage of 0.1 to 100 volt, preferably in the range from 1.5 to 30 volt. Regarding the current density, values from 0.0002 to 50 mA/cm$^2$, preferably 0.001 to 10 mA/cm$^2$ and especially 0.01 to 1 mA/cm$^2$ of specific surface area, have proved to be favorable and advantageous.

For the isolation and purification of the soluble polymers, the crude electrolysis products are, if appropriate together with the anode serving as a carrier, freed from conductive salts, monomers and ahering impurities by washing with solvents in which the polymers are insoluble, such as methylene chloride, tetrahydrofuran, ethanol and water. The prepurified products, preferably together with the carrier, are then digested in a solvent in which the polymers are soluble. Any impurities suspended in the solution are separated off by means of known methods such as filtration, centrifuging and decanting, and the pure polymers are then obtained by evaporation of the solvent. Yields of about 50 to 80% are possible in the process according to the invention.

In contrast to known electrically conductive polymers in a powder or film form, which are obtained by electrochemical oxidation of 3-methoxythiophene on smooth electrodes under standard electrolysis conditions, the polymers according to the invention, especially in the oxidized, i.e. electrically conductive form with a degree of doping of at least 10%, are completely and reversibly soluble in many dipolar aprotic solvents and differ from the hitherto known conductive polymers in their structure, their properties and their possible uses.

Suitable solvents for the polymers according to the invention, which show a bronze-metal gloss in the solid state, are dipolar aprotic solvents or solvent mixtures which have a $_p$ value greater than 3.5 (cal/ccm)$^{\frac{1}{2}}$ and a Hansen $_H$ value less than 6.5 (cal/ccm)1/2, such as acetone, acetonitrile, acrylonitrile, benzaldehyde, benzonitrile, $\gamma$-butyrolactone, $\epsilon$-caprolactone, crotonaldehyde, methyl cyanoacetate, N-methylformamide, N,N-dimethylformamide, dimethyl sulfoxide, diethyl sulfate, furfural, nitropropane, propionitrile, triethyl phosphate, 3-methoxypropionitrile, N-methylpyrrolidone, nitrobenzene, nitromethane, propylene carbonate, sulfur dioxide ($-10°$ C.) and sulfolan, preferably acetonitrile, acrylonitrile, benzonitrile, $\gamma$-butyrolactone, diethylsulfate, furfural, N-methylpyrrolidone, nitromethane, nitropropane, propionitrile, propylene carbonate and sulfur dioxide ($-10°$ C.). In the case of solvent mixtures which can also contain non-solvents, the resulting $\delta$ values have to be calculated in the manner indicated in the literature. The $\delta$ values are listed in Barton, Handbook of Solubility Parameters and other Cohesion Parameters, CRC Press, 1983, pages 153–161. Those solvents or solvent mixtures are preferably used, of which the $\delta_p$ value is greater than 5.5 (cal/ccm)$^{\frac{1}{2}}$ and the $\delta_H$ value is less than 5.0 (cal/ccm)$^{\frac{1}{2}}$. The values of preferred solvents are given below:

|  | $\delta_p$ | $\delta_H$ |
| --- | --- | --- |
| Furfural | 7.45 | 2.55 |
| Propylene carbonate | 9.0 | 2.05 |
| $\gamma$-Butyrolactone | 8.3 | 3.7 |
| Diethyl sulfate | 7.35 | 3.6 |
| Triethyl phosphate | 5.75 | 4.6 |
| Acetonitrile | 9.0 | 3.05 |
| Acrylonitrile | 8.7 | 3.4 |
| Propionitrile | 7.15 | 2.75 |
| Nitromethane | 9.4 | 2.55 |
| Nitropropane | 6.05 | 2.05 |
| N-Methyl-pyrrolidone | 6.15 | 3.6 |

Depending on the solvent, at least 0.1 g, preferably at least 1.0 g, of electrically conductive polymers can be dissolved in 100 ml of solvent, blue solutions being formed.

The electrical conductivity of the polymers according to the invention is $10^{-4}$ to 100 S/cm, in particular $10^{-3}$ to 10 S/cm. The UV/VIS/NIR spectrum of the oligomers shows an intensive absorption in the range from 550 to 1,000 nm, in particular in the range from 600 to 900 nm. The thermal stability of the polymers according to the invention is high. This manifests itself by the fact that they can be heated without decomposition to temperatures of up to 150° C., preferably up to 200° C. and especially up to 250° C.

The special properties in which the polymers according to the invention differ from the known conductive polymers allow their use even in applications where solubility and hence processability are necessary or advantageous. Applications which may be mentioned here are mixing into commercially available polymers or the application of electrically conductive layers, if appropriate of defined thickness, to conductive and non-conductive materials. The production of catalysts, electric switches, semiconductor components, solar cells, screening materials, camouflage paints, panel heater conductors, special electrodes and especially of conductive or antistatic films and fibers can be made possible or simplified by these processes.

The invention is illustrated in more detail by the examples which follow. The parts and percentages given in the examples relate to the weight, unless otherwise stated. The specific conductivity was determined on moldings by means of four-point measurement. The thermal decomposition behavior was determined by differential thermogravimetry (DTG) and differential scanning calorimetry (DSC). The purified polymers obtained in Examples 1 to 11 were soluble in acetonitrile at 25° C. to an extent of more than 0.5 g per 100 ml. These solutions had a reduced viscosity of 0.09 to 0.1 dl/g. In the UV/VIS/NIR spectrum, they showed a pronounced maximum at a wavelength of $\lambda=750$ to 775 nm. The purified oligomers obtained in Examples 12 to 21 were soluble in acetonitrile at 25° C. to an extent of more than 1.0 g per 100 ml. Solutions in acetonitrile showed a pronounced maximum in the UV/VIS/NIR spectrum at a wavelength of $\lambda=760$ nm with an extinction coefficient of $\epsilon=40,000$. The individual molecular weights and the molecular weight distribution of the oligomers according to the invention were determined on the neutral (undoped) form, which was obtained, for example, by electrochemical reduction on a platinum cathode at $-0.3$ V (versus Ag/AgCl), by means of mass spectroscopy (MS) and gel permeation chromatography (GPC). The UV/VIS/NIR spectra of the neutral (undoped) oligomers were measured on the eluate from GPC by means of an on-line diode array spectrometer.

EXAMPLE 1

4.34 parts of tetraethylammonium tetrafluoborate, 4.56 parts of 3-methoxythiophene and 250 parts of acetonitrile were placed in an undivided electrolytic cell with a cooling jacket. As desired, the cathode consisted of platinum or V2A stainless steel sheets of 80 mm length and 55 mm width. The anode used was a carbon felt (weight per unit area 0.35 kg/m²; specific surface area (BET) about 0.5 m²/g) of 80 mm length and 55 mm width (geometrical area of both sides about 90 cm²). The anode was fixed parallel to the cathode at a distance of 2 cm, separated by a spacer of a polypropylene netting. At an electrolysis temperature of 25° C. and an anode current of 400 mA, a cell voltage of 5 to 11 volt was required. After one third of the theoretically required quantity of current had been consumed, the anode laden with the polymer was exchanged for a new one. After two thirds of the theoretically required quantity of current had been consumed, the anode was replaced again, and the electrolysis was terminated after the theoretical quantity of current had been consumed. The anodes laden with the crude product were in each case placed into a methylene chloride bath immediately after the exchange and digested therein for a prolonged period. They were washed successively with methylene chloride and water, until the washing solutions remained virtually colorless. After drying the carbon felts laden with the polymer were digested in an acetonitrile bath until the polymer had gone virtually completely into solution. The deep dark blue solution was centrifuged for 0.5 hour at 10,000 rpm and the supernatant solution was concentrated to dryness in a rotary evaporator. 1.92 parts of a solid having a bronze-metal gloss were obtained. The elemental analysis gave the following figures: 45.3% C, 3.4% H, 21.1% S, 10.1% F. A powder molding of the ground product had a specific conductivity of $4\times10^{-4}$ S/cm. In TG, a weight loss of less than 10% up to 215° C. was observed. DSC showed an exothermic maximum at 315° C. Polymers which had a degree of polymerization of greater than six and the UV/VIS spectrum of which showed a maximum at $\lambda=466$ nm were detected by means of GPC of the undoped form.

EXAMPLE 2

4.52 parts of 3-methoxythiophene, 0.045 part of 2-methoxythiophene, 4.34 parts of tetraethylammonium tetrafluoborate and 250 parts of acetonitrile were electrolyzed in an undivided cell according to Example 1 and worked up, but not washed with water. This gave 1.7 parts of a solid having a bronze-metal gloss. The elemental analysis gave the following figures: 44.5% C, 3.4% H, 22.5% S, 10.2% F. A powder molding of the ground product had a specific conductivity of $2\times10^{-3}$ S/cm. In TG, a weight loss of less than 10% up to 200° C. was observed. DSC showed an exothermic maximum at 340° C. The reduced viscosity was 0.094 dl/g.

EXAMPLE 3

11.3 parts of 3-methoxythiophene, 0.11 part of 2-methoxythiophene, 10.8 parts of tetraethylammonium tetrafluoborate and 300 parts of acetonitrile were electrolyzed in an undivided cell according to Example 1 and worked up, but not washed with water and, instead of centrifuging, the product was filtered through a size G3 glass filter crucible. This gave 4.8 parts of a solid having a bronze-metal gloss. The elemental analysis gave the following figures: 44.3% C, 3.5% H, 22.5% S, 10.7% F. A powder molding of the ground product had a specific conductivity of $3\times10^{-3}$ S/cm. The reduced viscosity was 0.093 dl/g. In TG, the weight loss of less than 10% up to 210° C. was observed. DSC showed an exothermic maximum at 320° C.

EXAMPLE 4

56.5 parts of 3-methoxythiophene, 0.75 part of 2-methoxythiophene, 54.3 parts of tetraethylammonium tetrafluoborate and 1,500 parts of acetonitrile were placed into a trough-shaped undivided electrolytic cell. A water-cooled hollow cathode of V2A stainless steel of 170 mm length and 170 mm width was arranged in the middle of the cell. On both sides at a distance of 2 cm and parallel to the cathode, there was in each case an anode of carbon felt (specific surface area (BET): about 0.5 m²/g) of 170 mm length and 170 mm width (geometrical area of both sides in each case 600 cm²). Between the cathode and the anodes, there was in each case a polypropylene netting as a spacer. At an electrolysis temperature of 25° C. and an anode current of 4 A, a cell voltage of 5 to 11 volt was required. After one third of the theoretically required quantity of current had been consumed, the anodes laden with the polymer were exchanged for two new ones. After two thirds of the theoretically required quantity of current had been consumed, the anodes were again replaced, and after the theoretical quantity of current had been consumed, the electrolysis was terminated. The anodes laden with the crude product were each placed immediately after the exchange in into a methylene chloride bath and digested therein for a prolonged period. They were washed successively with methylene chloride and water until the washing solutions remained virtually colorless. After drying, the carbon felts laden with the polymer were digested in an acetonitrile bath until the polymer had gone virtually completely into solution. The deep dark blue solution was centrifuged for 0.5 hour at 10,000 rpm and the supernatant solution was concentrated to dryness in a rotary evaporator. 21.1 parts of a solid having a bronze-metal gloss were obtained. The elemental analysis gave the following figures: 42.9% C, 3.1% H, 22.5% S, 8.4% F. A powder molding of the ground product had a specific conductivity of $8 \times 10^{-4}$ S/cm. The reduced viscosity was 0.09 dl/g. In TG, a weight loss of less than 10% up to 260° C. was observed. DSC showed an exothermic maximum at 310° C.

EXAMPLE 5

4.56 parts of 3-methoxythiophene, 5.1 parts of 50% tetrafluoboric acid, 4.34 parts of tetraethylammonium tetrafluoborate and 300 parts of acetonitrile were electrolyzed in the undivided cell according to Example 1 and worked up. 2.4 parts of a solid having a bronze-metal gloss were obtained. The elemental analysis gave the following figures: 41.8% C, 3.1% H, 22.3% S, 13.0% F. A powder molding of the ground product had a specific conductivity of $2 \times 10^{-4}$ S/cm. The reduced viscosity was 0.095 dl/g. In TG, a weight loss of less than 10% up to 260° C. was observed. DSC showed an exothermic maximum at 305° C.

EXAMPLE 6

11.3 parts of 3-methoxythiophene, 0.11 part of 2,4-dimethoxythiophene, 4.34 parts of tetraethylammonium tetrafluoborate and 300 parts of acetonitrile were electrolyzed in the undivided cell according to Example 1 and worked up, but without washing with water. 4.1 parts of a solid having a bronze-metal gloss were obtained. The elemental analysis gave the following figures: 43.1% C, 3.2% H, 22.0% S, 10.9% F. A powder molding of the ground product had a specific conductivity of $2 \times 10^{-4}$ S/cm. The reduced viscosity was 0.096 dl/g. In TG, a weight loss of less than 10% up to 250° C. was observed. DSC showed an exothermic maximum at 305° C.

EXAMPLE 7

4.52 parts of 3-methoxythiophene, 0.045 part of 2-methoxythiophene, 6.59 parts of tetrabutylammonium tetrafluoborate and 250 parts of acetonitrile were electrolyzed in the undivided cell according to Example 1 and worked up, but not washed with water. 1.5 parts of a solid having a yellow-metal gloss were obtained. The elemental analysis gave the following figures: 41.0% C, 3.4% H, 18.5% S, 15.0% F. A powder molding of the ground product had a specific conductivity of $1 \times 10^{-4}$ S/cm. The reduced viscosity was 0.098 dl/g. In TG, a weight loss of less than 10% up to 250° C. was observed. DSC showed an exothermic maximum at 310° C.

EXAMPLE 8

4.56 parts of 3-methoxythiophene, 6.59 parts of tetrabutylammonium tetrafluoborate and 250 parts of benzonitrile were electrolyzed in the undivided cell according to Example 1 and worked up, but not washed with water. 1.9 parts of a solid having a bronze-metal gloss were obtained. The elemental analysis gave the following figures: 44.5% C, 3.2% H, 21.6% S, 10.5% F. A powder molding of the ground product had a specific conductivity of $3 \times 10^{-4}$ S/cm. The reduced viscosity was 0.097 dl/g. In TG, a weight loss of less than 10% up to 270° C. was observed. DSC showed an exothermic maximum at 312° C.

EXAMPLE 9

56.5 parts of 3-methoxythiophene, 0.75 part of 2-methoxythiophene, 54.3 parts of tetraethylammonium tetrafluoborate and 1,500 parts of acetonitrile were electrolyzed in the undivided cell according to Example 4 and worked up. However, the anodes consisted of carbon felt (specific surface area (BET): 0.3 to 0.4 m²/g). 15.4 parts of a solid having a bronze-metal gloss were obtained. The elemental analysis gave the following figures: 42.9% C, 3.2% H, 23.6% S, 11.3% F. A powder molding of the ground product had a specific conductivity of $4 \times 10^{-4}$ S/cm. The reduced viscosity was 0.096 dl/g. In TG, a weight loss of less than 10% up to 250° C. was observed. DSC showed an exothermic maximum at 320° C.

EXAMPLE 10

4.56 parts of 3-methoxythiophene, 9.12 parts of tetraethylammonium tetrafluoborate and 400 parts of acetonitrile were electrolyzed in an undivided cell according to Example 1 and worked up. However, the anode consisted of an 8-ply gauze of 90 mm length and 55 mm width of 95:5 platinum/rhodium wire of 0.07 mm diameter. In working-up, the product was not washed with water and, instead of centrifuging, it was filtered through a size G3 glass filter crucible. 1.1 parts of a solid having a bronze-metal gloss were obtained. The elemental analysis gave the following figures: 39.4% C, 3.0% H, 20.1% S, 14.9% F. A powder molding of the ground product had a specific conductivity of $4 \times 10^{-4}$ S/cm. The reduced viscosity was 0.095 dl/g. In TG, a weight loss of less than 10% up to 270° C. was observed. DSC showed an exothermic maximum at 320° C.

EXAMPLE 11

1.2 parts of 3-methoxythiophene, 11.6 parts of 3-ethoxythiophene, 21.7 parts of tetraethylammonium tetrafluoborate and 300 parts of acetonitrile were electrolyzed in an undivided cell according to Example 1 and worked up, but not washed with water. 1.2 parts of a solid having a blue-black gloss were obtained. The elemental analysis gave the following figures: 35.8% C, 3.1% H, 16.6% S, 16.8% F. A powder molding of the ground product had a specific conductivity of $3 \times 10^{-4}$ S/cm. The reduced viscosity was 0.094 dl/g. In TG, a weight loss of less than 10% up to 250° C. was observed. DSC showed an exothermic maximum at 320°

C. COMPARATIVE EXAMPLE A 2.28 parts of 3-methoxythiophene, 3.29 parts of tetrabutylammonium tetrafluoborate and 250 parts of acetonitrile were placed in an undivided electrolytic cell with a magnetic stirrer and a cooling jacket. The cathode and anode consisted of smooth platinum sheets which had a specific surface area of markedly less than 0.01 m²/g and a length of 80 mm and a width of 55 mm in each case and which were arranged mutually parallel at a distance of 2 cm. At a temperature of 25° C. and an anode current density of 2 mA/cm², a dark electrode covering was obtained after 2 hours + electroylsis time, which covering gave 0.7 part of a black powder after washing with methylene chloride and drying. The elemental analysis gave the following figures: 41.5% C, 2.8% H, 21.6% S, 5.4% F. A powder molding of the ground product had a specific conductivity of $4 \times 10^{-4}$ S/cm. In TG a weight loss of less than 10% up to 200° C. was observed. DSC showed an exothermic maximum at 295° C. It was not possible to dissolve a sample of 0.1 g of the purified polymer in 100 ml of acetonitrile.

EXAMPLE 12

4.34 parts of tetraethylammonium tetrafluoborate, 4.56 parts of 3-methoxythiophene and 250 parts of acetonitrile were placed in an undivided electrolytic cell with a cooling jacket. The cathode consisted of V2A stainless steel sheets of 80 mm length and 55 mm width. The anode used was a carbon felt (weight per unit area about 0.3 kg/m², specific surface area (BET) about 1.5 m²/g) of 80 mm length, 55 mm width and 3 mm thickness (geometrical area of both sides about 90 cm²) The anode was fixed parallel to the cathode at a distance of 2 cm, separated by a spacer of polypropylene netting. At an electrolysis temperature of 20° C. and an anode current of 400 mA, a cell voltage of 5 to 11 volt resulted. After one half of the theoretically required quantity of current had been consumed, the anode laden with the oligomers was exchanged for a new one, and after the theoretical quantity of current had been consumed, the electrolysis was terminated. The anodes laden with the crude product were each dried immediately after the exchange and placed in a methylene chloride bath and digested therein several times for a prolonged period. After renewed drying, the carbon felts laden with the oligomers were digested in an acetonitrile bath until the oligomers had gone virtually completely into solution. The deep dark blue solution was concentrated to dryness in a rotary evaporator. The crude product was mechanically comminuted, washed with water, dried, digested for 12 hours with methylene chloride and then filtered off and dried. For further purification, the material obtained was redissolved in acetonitrile and centrifuged for 0.5 hour at 10,000 rpm, and the centrifugate was concentrated to dryness in a rotary evaporator. 1.92 parts of a solid having a bronze-metal gloss were obtained. The elemental analysis gave the following figures: 44.5% C, 3.2% H, 22.1% S, 9.4% F. A powder molding of the ground product had a specific conductivity of $1.8 \times 10^{-3}$ S/cm. In DTG, a weight loss of less than 10% up to 245° C. was observed. DSC showed a maximum at 325° C. In the mass spectrum of the undoped form, the molecule ions of the pentamer (m/e=562) and hexamer (m/e=674) were detected. GPC of the undoped form showed that more than 80% of the product was composed of petamers and hexamers. In the UV/VIS/NIR spectrum in tetrahydrofuran, the undoped pentamer showed a maximum at $\lambda=460$ nm and the undoped hexamer showed a maximum at $\lambda=486$ nm.

EXAMPLE 13

4.56 parts of 3-methoxythiophene, 6.59 parts of tetrabutylammonium tetrafluoborate and 300 parts of acetonitrile were electrolyzed in the electrolytic cell according to Example 12, but with the use of an Ag/AgCl reference electrode at a constant anode potential of 1.48 V (versus Ag/AgCl) and worked up according to Example 12. 2.2 parts of a solid having a bronze-metal gloss were obtained. The elemental analysis gave the following figures: 45.1% C, 3.2% H, 23.1% S, 9.6% F. A powder molding of the ground product had a specific conductivity of $7.1 \times 10^{-3}$ S/cm. In DTG, a weight loss of less than 10% up to 260° C. was observed. DSC showed a maximum at 305° C. In the mass spectrum of the undoped form, the molecule ions of the pentamer (m/e=562) and hexamer (m/e=674) were detected. GPC of the undoped form showed that more than 80% of the product was composed of pentamers and hexamers. In the UV/VIS/NIR spectrum in tetrahydrofuran, the undoped pentamer showed a maximum at $\lambda=460$ nm and the undoped hexamer showed a maximum at $\lambda=486$ nm.

EXAMPLE 14

56.5 parts of 3-methoxythiophene, 54.3 parts of tetraethylammonium tetrafluoborate and 1,500 parts of acetonitrile were placed in a trough-shaped undivided electrolytic cell. A water-cooled hollow V2A stainless steel cathode of 170 mm length and 170 mm width was arranged in the middle of the cell. On both sides at a distance of 2 cm and parallel to the cathode, there was in each case an anode of carbon felt (weight per unit area 0.4 kg/m², specific surface area (BET) about 1.5 m²/g) of 170 mm length, 170 mm width and 4 mm thickness. Between the cathode and the anodes there was in each case a polypropylene netting as a spacer. At an electrolysis temperature of 25° C. and an anode current of 4 A, a cell voltage of 5 to 11 volt resulted. After the theoretically required quantity of current had been consumed, the electrolysis was terminated. The anodes laden with the crude product were each dried immediately and placed in a methylene chloride bath and digested therein several times for a prolonged period. After renewed drying, the carbon felts laden with the oligomers were digested in an acetonitrile bath until the oligomers had gone virtually completely into solution. The deep dark blue solution was filtered through a size G3 glass filter crucible and the filtrate was concentrated to dryness in a rotary evaporator. The crude product was mechanically comminuted, washed with water, dried, digested for 12 hours with methylene chloride and then filtered off and dried. 24.2 parts of a solid having a bronze-metal gloss were obtained. The elemental analysis gave the following figures: 44.4% C, 3.2% H, 23.2% S, 7.5% F. A powder molding of the ground product had a specific conductivity of $2.1 \times 10^{-3}$ S/cm. In DTG, a weight loss of less than 10% up to 260° C. was observed. DSC showed a maximum at 310° C. In the mass spectrum of the undoped form, the molecule ions of the pentamer (m/e=562) and hexamer (m/e=674) were detected. GPC of the undoped form showed that more than 90% of the product was composed of pentamers and hexamers. In the UV/VIS/NIR spectrum in tetrahydrofuran, the undoped pentamer showed a maximum at λ=460 nm, and the undoped hexamer showed a maximum at λ=486 nm.

EXAMPLE 15

4.33 parts of 3-methoxythiophene, 0.23 part of 2-methoxythiophene, 4.34 parts of tetraethylammonium tetrafluoborate and 250 parts of acetonitrile were electrolyzed in the undivided cell according to Example 12 and worked up. 1.4 parts of a solid having a bronze-metal gloss were obtained. The elemental analysis gave the following figures: 44.4% C, 2.9% H, 23.0% S, 8.5% F. A powder molding of the ground product had a specific conductivity of $2.1 \times 10^{-3}$ S/cm. In DTG, a weight loss of less than 10% up to 200° C. was observed. DSC showed a maximum at 340° C. In the mass spectrum of the undoped form, the molecule ions of the pentamer (m/e=562) and hexamer (m/e=674) were detected. GPC of the undoped form showed that more than 90% of the product was composed of pentamers and hexamers.

EXAMPLE 16

4.33 parts of 3-methoxythiophene, 0.26 part of 3-ethoxythiophene, 4.34 parts of tetraethylammonium tetrafluoborate and 250 parts of acetonitrile were electrolyzed in an electrolytic cell according to Example 12 and worked up. 1.2 parts of a solid having a bronze-metal gloss were obtained. The elemental analysis gave the following figures: 42.5% C, 2.9% H, 22.9% S, 9.0% F. A powder molding of the ground product had a specific conductivity of $2.0 \times 10^{-3}$ S/cm. In DTG, a weight loss of less than 10% up to 210° C. was observed. DSC showed a maximum at 320° C. In the mass spectrum of the undoped form, the molecule ion of the pentamer (m/e=576) of four methoxythiophene units and one ethoxythiophene unit was detected.

EXAMPLE 17

4.33 parts of 3-methoxythiophene, 0.31 part of 3-butoxythiophene, 4.34 parts of tetraethylammonium tetrafluoborate and 250 parts of acetonitrile were electrolyzed in an electrolytic cell according to Example 12 and worked up. 1.5 parts of a solid having a bronze-metal gloss were obtained. The elemental analysis gave the following figures: 45.6% C, 3.3% H, 22.0% S, 8.9% F. A powder molding of the ground product had a specific conductivity of $4 \times 10^{-3}$ S/cm. In DTG, a weight loss of less than 10% up to 250° C. was observed. DSC showed a maximum at 305° C. In the mass spectrum of the undoped form, the molecule ion of the pentamer (m/e=604) of four methoxythiophene units and one butoxythiophene unit was detected.

EXAMPLE 18

4.33 parts of 3-methoxythiophene, 0.31 part of 2-methylthiophene, 4.34 parts of tetraethylammonium tetrafluoborate and 250 parts of acetonitrile were electrolyzed in an electrolytic cell according to Example 12 and worked up. 1.4 parts of a solid having a bronze-metal gloss were obtained. The elemental analysis gave the following figures: 46.1% C, 3.3% H, 22.2% S, 8.5% F. A powder molding of the ground product had a specific conductivity of $2 \times 10^{-3}$ S/cm. In DTG, a weight loss of less than 10% up to 250° C. was observed. DSC showed a maximum at 310° C. In the mass spectrum of the undoped form, the molecule ion of the pentamer (m/e=546) of four methoxythiophene units and one methylthiophene unit was detected.

EXAMPLE 19

4.47 parts of 3-methoxythiophene, 0.054 part of pyrrole, 4.34 parts of tetraethylammonium tetrafluoborate and 250 parts of acetonitrile were electrolyzed in an electrolytic cell according to Example 12 and worked up. 1.4 parts of a solid having a bronze-metal gloss were obtained. The elemental analysis gave the following figure: 46.5% C, 3.3% H, 3.7% N, 21.1% S, 6.6% F. A powder molding of the ground product had a specific conductivity of $2 \times 10^{-3}$ S/cm. In DTG, a weight loss of less than 10% up to 240° C. was observed. DSC showed a maximum at 300° C.

EXAMPLE 20

4.56 parts of 3-methoxythiophene, 6.59 parts of tetrabutylammonium tetrafluoborate and 250 parts of benzonitrile were electrolyzed in an Electrolytic cell according to Example 12 and worked up. 1.9 parts of a solid having a bronze-metal gloss were obtained. The elemental analysis gave the following figures: 42.9% C, 3.1% H, 22.5% S, 8.4% F. A powder molding of the ground product had a specific conductivity of $1.2 \times 10^{-3}$ S/cm. In DTG, a weight loss of less than 10% up to 270° C. was observed. DSC showed a maximum at 312° C. In the mass spectrum of the undoped form, the molecule ions of the pentamer (m/e =562) and hexamer (m/e=674) were detected.

EXAMPLE 21

5.13 parts of 3-ethoxythiophene, 4.34 parts of tetraethylammonium tetrafluoborate and 250 parts of acetonitrile were electrolyzed according to Example 13 and worked up. 1.2 parts of a solid having a bronze-metal gloss were obtained. The elemental analysis gave the following figures: 48.1% C, 4.2% H, 19.8% S, 8.5% F. A powder molding of the ground product had a specific conductivity of $1.0 \times 10^{-2}$ S/cm. In DTG, a weight loss of less than 10% up to 205° C. was observed. DSC showed a maximum at 305° C. In the mass spectrum of the undoped form, the molecule ion of the pentamer (m/e=632) was detected.

EXAMPLE 22

4.33 parts of 3-methoxythiophene, 0.29 part of 2,4-dimethoxythiophene, 4.34 parts of tetraethylammonium tetrafluoborate and 250 parts of acetonitrile were electrolyzed in the undivided cell according to Example 12 and worked up. 1.15 parts of a solid having a bronze-metal gloss were obtained. The elemental analysis gave the following figures: 44.1% C, 2.7%H, 22.7%S, 8.4% F. A powder molding of the ground product had a specific conductivity of $3 \times 10^{-4}$ S/cm. In DTG, a weight loss of less than 10% up to 200° C. was observed.

In the mass spectrum of the undoped form, the molecule ions of the pentamer (m/e=592) and were detected. GPC of the undoped form showed that more than 80% of the product was composed of pentamers and hexamers.

EXAMPLE 23

4.33 parts of 3-methoxythiophene, 0.29 part of 3,4-dimethoxythiophene, 4.34 parts of tetraethylammonium tetrafluoborate and 250 parts of acetonitrile were electrolyzed in the undivided cell according to Example 12 and worked up. 1.06 parts of a solid having a bronze-metal gloss were obtained. The elemental analysis gave the following figures: 44.0% C, 2.7% H, 22.7% S, 8.5% F. A powder molding of the ground product had a specific conductivity of $2.1 \times 10^{-3}$ S/cm. In DTG, a weight loss of less than 10% up to 200° C. was observed.

In the mass spectrum of the undoped form, the molecule ions of the pentamer (m/e=592) were detected. GPC of the undoped form showed that more than 80% of the product was composed of pentamers and hexamers.

EXAMPLE 24

4.33 parts of 3-methoxythiophene, 5.58 parts of trifluoromethanesulfonate and 250 parts of acetonitrile were electrolyzed in the undivided cell according to Example 12 and worked up. 0.88 parts of a solid having a bronze-metal gloss were obtained. The elemental analysis gave the following figures: 43.4% C, 3.0% H, 24.9% S, 7.0% F. A powder molding of the ground product had a specific conductivity of $1.4 \times 10^{-3}$ S/cm. In DTG, a weight loss of less than 10% up to 200° C. was observed.

In the mass spectrum of the undoped form, the molecule ions of the pentamer (m/e=562) and hexamer (m/e=674) were detected. GPC of the undoped form showed that more than 80% of the product was composed of pentamers and hexamers.

We claim:

1. An intrinsically electrically conductive polymer having 3 to 10 structural units structural units which are mutually linked in the 2-position and/or 5-position and are comprised, as a statistical mean, of 60 to 100% by weight of structural units which are derived from at least one monomer of the formula (I)

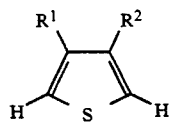

in which
$R^1$ is a $C_1$-$C_{12}$-alkoxy group or —O(CH$_2$CH$_2$O)$_n$CH$_3$ with n=1 to 4 and
$R^2$ is a hydrogen atom, a $C_1$-$C_{12}$-alkyl group, a $C_1$-$C_{12}$-alkoxy group or —O(CH$_2$CH$_2$O)$_n$CH$_3$ with n=1 to 4, or
$R^1$ and $R^2$ together are —O(CH$_2$)$_m$—CH$_2$ or —O(CH$_2$)$_m$—O— with m=1 to 12,
of 0 to 40% by weight of structural units which are derived from at least one monomer of the formula (II)

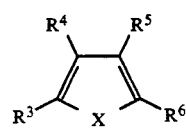

in which $R^4$ and $R^5$ independently of one another are a hydrogen atom, a halogen atom, a $C_1$-$C_{12}$-alkyl group or aryl or, together with the carbon atoms linking them, form an aromatic ring,
$R^3$ and $R^6$ independently of one another are a hydrogen atom or $R^3$ together with $R^4$ and the carbon atoms linking them or $R^5$ together with $R^6$ and the carbon atoms linking them in each case form an aromatic ring, and X is an oxygen atom, a sulfur atom, an =NH group, an =N-alkyl group or an =N-aryl group,
of 0 to 40% by weight of structural units which are derived from at least one monomer of the formula (III)

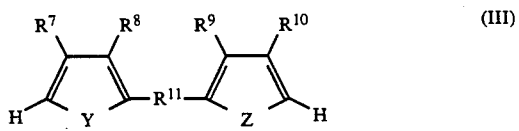

in which
$R^7$, $R^8$, $R^9$ and $R^{10}$ independently of one another are a hydrogen atom, a $C_1$-$C_{12}$-alkyl group, a $C_1$-$C_{12}$-alkoxy group or an aryl group,
Y and Z independently of one another are an oxygen atom, a sulfur atom, an =NH group, an =N-alkyl group or an =N-aryl group and
$R^{11}$ is an arylene group, a heteroarylene group or a conjugated system of the formula (CH=CH)$_o$, where o is zero, 1, 2 or 3, and
of 0 to 40% by weight of structural units which are derived from at least one monomer of the formula (IV)

in which
$R^{12}$ and $R^{13}$ independently of one another are a hydrogen atom, a halogen atom, a $C_1$-$C_{12}$-alkyl group, a $C_1$-$C_{12}$-alkoxy group, a $C_1$-$C_4$-alkylamino group or a $C_1$-$C_4$-acylamino group,
$R^{14}$ is a halogen atom, a $C_1$-$C_{12}$-alkyl group, a $C_1$-$C_{12}$-alkoxy group, a $C_1$-$C_4$-alkylamino group or a $C_1$-$C_4$-acyl-amino group and
X is as defined above,
the polymer in the oxidized form being completely soluble in dipolar aprotic solvents or solvent mixtures at 25° C., solutions with a content of at lest 0.1 g of polymer in 100 ml of solvent being obtained at 25° C., said solvents or solvent mixtures having a $\delta_p$ value greater than 3.5 (cal/ccm)$^{\frac{1}{2}}$ and a Hansen $\delta_H$ value less than 6.5 (cal/ccm)$^{\frac{1}{2}}$.

2. An intrinsically electrically conductive polymer as claimed in claim 1, wherein at least one of the two end groups consist of a structural unit which is derived from a compound of the formula (IV)

in which
- $R^{12}$ and $R^{13}$ independently of one another are a hydrogen atom, a halogen atom, a $C_1$-$C_{12}$-alkyl group or a $C_1$-$C_{12}$-alkoxy group and
- $R^{14}$ is a halogen atom, a $C_1$-$C_{12}$-alkyl group or a $C_1$-$C_{12}$-alkoxy group and
- X is as defined in claim 1.

3. An intrinsically electrically conductive polymer as claimed in claim 1, wherein, in the formula (I), $R^1$ is $OCH_3$ or $OC_2H_5$ and $R^2$ is H.

4. An intrinsically electrically conductive polymer as claimed in claim 1, from which solutions with a concentration of at least 1.0 g of polymer in 100 ml of a dipolar aprotic solvent can be prepared at 25° C.

5. An intrinsically electrically conductive polymer as claimed in claim 1, which has an electrical conductivity of $10^{-4}$ to 100 S/cm.

6. An intrinsically electrically conductive polymer as claimed in claim 1, dissolved in a dipolar aprotic solvent, wherein the dipolar aprotic solvent is acetone, acetonitrile, gamma-butyrolactone, epsilon-caprolactam, crotonaldehyde, methyl cyanoacetate, N-methylformamide, N,N-dimethyl formamide, dimethylsulfoxide, diethylsulfate, furfural, nitropropane, propionitrile, triethyl phosphate, 3-methoxypropionitrile, N-methylpyrrolidone, nitrobenzene, nitromethane, propylene carbonate, sulfolan, liquified or dissolved sulfur dioxide, or mixtures thereof, with each other or with non-solvents.

7. An electrically conductive coating composition comprising at least about 0.1 g of an intrinsically electrically conductive polymer of claim 1 dissolved in each 100 ml of solvent, said solvent comprising a dipolar aprotic solvent.

8. A coating composition as claimed in claim 1, wherein said solution contains at least about 1 g of said polymer per 100 ml of solvent, and wherein said solvent comprises acetonitrile, acrylonitrile, benzonitrile, gamma-butyrolactone, diethylsulfate, furfural, N-methylpyrrolidone, nitromethane, nitropropane, propionitrile, propylene carbonate, or liquified or dissolved sulfur dioxide.

9. An electrically non-conductive material coated with a coating composition of claim 8.

10. An electrically non-conductive film or fiber coated with a coating composition of claim 8.

11. An intrinsically electrically conductive polymer as claimed in claim 1, wherein said solvents or solvent mixtures have a $\delta_p$ value greater than 5.5 (cal/ccm)$^{\frac{1}{2}}$ and a Hansen $\delta_H$ value less than 5.0 (cal/ccm)$^{\frac{1}{2}}$.

12. An intrinsically electrically conductive polymer having 3 to 10 structural units which are mutually linked in the 2-position and/or 5-position and are comprised, as a statistical mean, of 50 to 100% by weight of structural units which are derived from at least one monomer of the formula (I)

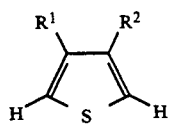

in which
- $R^1$ is a $C_1$-$C_{12}$-alkoxy group or —O(CH$_2$CH$_2$O)$_n$CH$_3$ with n=1 to 4 and
- $R^2$ is a hydrogen atom, a $C_1$-$C_{12}$-alkyl group, a $C_1$-$C_{12}$-alkoxy group or —O(CH$_2$CH$_2$O)$_n$CH$_3$ with n=1 to 4, or
- $R^1$ and $R^2$ together are —O(CH$_2$)$_m$—CH$_2$ or —O(CH$_2$)$_m$—O— with m=1 to 12.

of 0 to 40% by weight of structural units which are derived from at least one monomer of the formula (II)

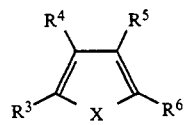

in which
- $R^4$ and $R^5$ independently of one another are a hydrogen atom, a halogen atom, a $C_1$-$C_{12}$-alkyl group or aryl or, together with the carbon atoms linking them, form an aromatic ring,
- $R^3$ and $R^6$ independently of one another are a hydrogen atom or $R^3$ together with $R^4$ and the carbon atoms linking them or $R^5$ together with $R^6$ and the carbon atoms linking them in each case form an aromatic ring, and
- X is an oxygen atom, a sulfur atom, an =NH group, an =N-alkyl group or an =N-aryl group, of 0 to 40% by weight of structural units which are derived from at least one monomer of the formula (III)

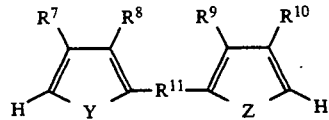

in which
- $R^7$, $R^8$, $R^9$ and $R^{10}$ independently of one another are a hydrogen atom, a $C_1$-$C_{12}$-alkyl group, a $C_1$-$C_{12}$-alkoxy group or an aryl group,
- Y and Z independently of one another are an oxygen atom, a sulfur atom, an =NH group, an =N-alkyl group or an =N-aryl group and
- $R^{11}$ is an arylene group, a heteroarylene group or a conjugated system of the formula (CH=CH)$_o$, where o is zero, 1, 2 or 3, and of up to 40% by weight of structural units which are derived from at least one monomer of the formula (IV)

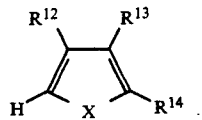

in which
- $R^{12}$ and $R^{13}$ independently of one another are a hydrogen atom, a halogen atom, a $C_1$-$C_{12}$-alkyl group, a $C_1$-$C_{12}$-alkoxy group, a $C_1$-$C_4$-alkylamino group or a $C_1$-$C_4$-acylamino group,
- $R^{14}$ is a halogen atom, a $C_1$-$C_{12}$-alkyl group, a $C_1$-$C_{12}$-alkoxy group, a $C_1$-$C_4$-alkylamino group or a $C_1$-$C_4$-acylamino group and
- X is as defined above,
- the end groups of said intrinsically electrically conductive polymer being structural units derived from a monomer of said formula (IV),
- the polymer in the oxidized form being completely soluble in dipolar aprotic solvents or solvent mixtures at 25° C., solutions with a content of at least 0.1 g of polymer in 100 ml of solvent being obtained at 25° C., said solvents or solvent mixtures having a $\delta_p$ value greater than 3.5 (cal/ccm)$^{\frac{1}{2}}$ and a Hansen $\delta_H$ value less than 6.5 (cal/ccm)$^{\frac{1}{2}}$.

* * * * *